United States Patent [19]
Allsop et al.

[11] Patent Number: 5,658,119
[45] Date of Patent: *Aug. 19, 1997

[54] VEHICLE-MOUNTED BICYCLE SUPPORT RACK

[75] Inventors: Ivor J. Allsop; Eivind Clausen, both of Bellingham, Wash.

[73] Assignee: Softride, Inc., Bellingham, Wash

[*] Notice: The term of this patent shall not extend beyond the expiration date of Pat. No. 5,527,146.

[21] Appl. No.: 484,410

[22] Filed: Jun. 7, 1995

Related U.S. Application Data

[63] Continuation-in-part of Ser. No. 277,678, Jul. 18, 1994, Pat. No. 5,527,146, which is a continuation-in-part of Ser. No. 979,800, Nov. 20, 1992, Pat. No. 5,330,312, which is a division of Ser. No. 587,061, Sep. 26, 1990, Pat. No. 5,181,822, which is a continuation-in-part of Ser. No. 397,693, Aug. 23, 1989, abandoned.

[51] Int. Cl.$^6$ ............................................. B60R 09/08
[52] U.S. Cl. .................... 414/462; 224/536; 224/537; 224/924
[58] Field of Search .......................... 224/488, 502, 224/519, 521, 536, 537, 924; 280/513; 414/462, 465, 466, 482, 483, 546, 743, 917

[56] References Cited

U.S. PATENT DOCUMENTS

| | | |
|---|---|---|
| 2,431,400 | 11/1947 | Iverson . |
| 3,606,111 | 9/1971 | Gjesdahl . |
| 3,656,670 | 4/1972 | Hill . |
| 3,712,522 | 1/1973 | Penniman . |
| 3,757,975 | 9/1973 | Sneider . |
| 3,854,641 | 12/1974 | Kohls . |
| 4,050,616 | 9/1977 | Mosow . |
| 4,078,708 | 3/1978 | Mayer . |
| 4,089,448 | 5/1978 | Traeger . |
| 4,189,274 | 2/1980 | Shaffer . |
| 4,297,069 | 10/1981 | Worthington . |
| 4,336,897 | 6/1982 | Luck . |
| 4,400,129 | 8/1983 | Eisenberg et al. . |
| 4,403,176 | 9/1983 | Carlson et al. . |
| 4,411,580 | 10/1983 | Kelly . |
| 4,456,421 | 6/1984 | Robson . |
| 4,461,410 | 7/1984 | Tartaglia . |
| 4,461,413 | 7/1984 | Hoerner . |
| 4,573,855 | 3/1986 | Braswell . |
| 4,635,835 | 1/1987 | Cole . |
| 4,640,658 | 2/1987 | Webb, Jr. . |
| 4,673,328 | 6/1987 | Shiels . |
| 4,676,414 | 6/1987 | Deguevara . |
| 4,813,584 | 3/1989 | Wiley . |
| 4,826,387 | 5/1989 | Audet . |
| 5,025,932 | 6/1991 | Jay . |

*Primary Examiner*—Karen B. Merritt
*Assistant Examiner*—Janice L. Krizek
*Attorney, Agent, or Firm*—Christensen O'Connor Johnson & Kindness, PLLC

[57] ABSTRACT

A support rack for carrying articles behind a vehicle is disclosed. The rack includes a base member, a forward beam, a rearward beam, a top member, and lock arms. The base member is securable to the rearward end of the vehicle. The forward and rearward beams are pivotally connected to the base member and project upwardly therefrom. The beams are parallel to each other and together form a parallelogram with the base member and the top member. The top member is pivotally connected to the forward and rearward beams. The lock arms are for releasably locking the forward beam and the rearward beam in upright positions above the base member. Support arms are also slidably coupled to the top member for securing bicycles thereon. A crank clamp attachment structure is also provided, which fits on top of the top member to hold extra bicycles. The crank clamp attachment structure includes crank clamps and wheel rails. A crank clamp embodiment is also disclosed to secure bicycles behind a vehicle without a pivoting support rack. A base beam projects behind the vehicle and is attached to two crank clamps and wheel rails to securely hold bicycles.

27 Claims, 9 Drawing Sheets

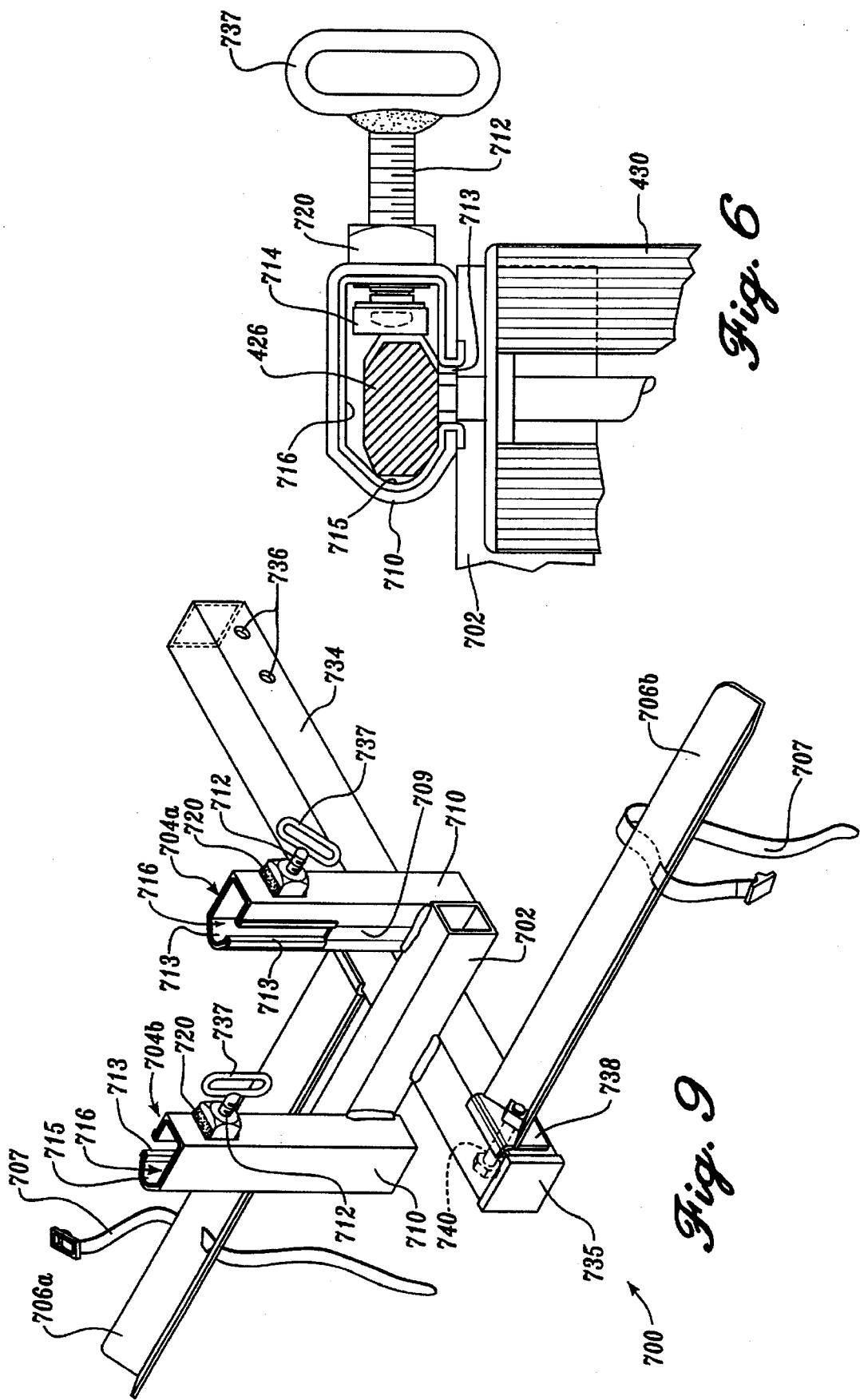

VEHICLE-MOUNTED BICYCLE SUPPORT RACK

This application is a continuation-in-part of application Ser. No. 08/277,678, filed Jul. 18, 1994, now U.S. Pat. No. 5,527,146, which is a continuation-in-part of application Ser. No. 07/979,800 filed Nov. 20, 1992, now U.S. Pat. No. 5,330,312; which was a divisional of application Ser. No. 07/587,061 filed Sep. 26, 1990, now U.S. Pat. No. 5,181,822; which was a continuation-in-part of application Ser. No. 07/397,693 filed Aug. 23, 1989, now abandoned.

TECHNICAL FIELD

The present invention pertains to support frames for supporting objects on the exterior of motor vehicles, and, more particularly, to a bicycle support rack that is attachable to vehicle trailer hitches.

BACKGROUND OF THE INVENTION

Support racks are typically mounted on the exterior of a motor vehicle to support bicycles, minibikes, skis, surfboards, and the like, above the ground. Rear-mounted racks are constructed of rigid frame members, having arms extending horizontally therefrom for supporting objects, and they are usually mounted on the rear bumper of the vehicle, or on the trunk lid, or a combination of both. Several racks have also been developed for use on the top of a vehicle. These racks are usually held by straps extending to the rain gutters or door recesses of a vehicle.

While these support racks have been somewhat adequate for their purposes, they have several drawbacks. Because the rear-mounted racks are fixedly mounted on the rear of the vehicle, the racks themselves restrict access to vehicles having rearward-opening doors, tailgates, or lift gates, such as sport/utility vehicles, vans, pickup trucks, campers, and the like. When mounted on the rear of cars, these racks may also interfere with the opening of or access to the trunk. Another problem arises with some bicycle racks on the front or rear of vehicles when the bicycles are placed next to each other. The bicycles may contact one another or the vehicle, causing scratched paint, bicycle component damage, or other vehicle or bicycle damage, especially when the vehicle is moving.

The cartop racks, while keeping the bicycles separated, have the drawback of requiring that the article to be transported be lifted on top of the vehicle. This can be quite difficult on a tall vehicle, such as a sport/utility vehicle or van, especially when a heavy or awkward object is to be carried, such as a bicycle. Other drawbacks include extra drag on the vehicle, especially at high speeds; increased effective vehicle height resulting in decreased overhead clearance, a serious problem when entering a parking garage; and marring of the vehicle surface due to contact of the rack and straps.

Several devices have been proposed for overcoming these disadvantages. For instance, U.S. Pat. No. 4,400,129, issued to Eisenberg et al. on Aug. 23, 1983, discloses a pair of horizontally projecting arms mounted to the crossmember of a T-shaped support member that in turn is pivotally mounted to a vehicle. A substantial drawback to this device is that, as the T-shaped support member is pivoted downward, the pair of arms angle downward, allowing an object supported thereon to slide off. Even if the object were firmly fastened to the support member, it would not be held in an upright position as the support arm is pivoted downward. The device also does not prevent the bicycles from knocking into one another or the vehicle as the vehicle moves and the bicycles swing. Even the contact of the frame with the rack support arms can mar the bicycle paint.

Consequently, there is a need for a support rack that can be mounted to the rear of a vehicle and that not only allows access to the rear doors of the vehicle, but also maintains the objects in an upright separated position so as to not contact each other or the vehicle.

SUMMARY OF THE INVENTION

A crank clamp assembly for holding bicycles behind a vehicle is provided. The crank clamp assembly includes an attachment structure, a support member, and a first crank clamp. The attachment structure is coupleable to the vehicle. The support member is attached to the attachment structure. The first crank clamp is arranged and configured to secure a crank arm of a bicycle. The crank clamp is affixed to the support member.

In the preferred embodiment of the crank clamp assembly, a first wheel holddown is provided for securing a wheel of the bicycle held by the crank clamp. The first wheel holddown is affixed to the support member. A second wheel holddown may also be provided on the preferred embodiment of the crank clamp assembly, which includes a second crank clamp. A third crank clamp and a third wheel holddown may also be provided, as discussed above.

In one embodiment of the crank clamp assembly, the attachment structure comprises a base member for engagement with a vehicle hitch and a beam attached to the base member. The beam extends upwardly from the base member, and the support member is attached to the beam. In one embodiment, the beam is fixedly attached to the base member.

In anther embodiment, a rack for carrying bicycles with a vehicle is provided. The rack includes a base member, a first support member, a top member, and a crank clamp. The base member is securable to the vehicle to project away from the vehicle. The first support member has a bottom end and a top end, the bottom end being pivotally connected to the base member and projecting upwardly therefrom. The top member is connected to the top end of the first beam. The crank clamp is connected to the top member, the crank clamp including a housing for receiving a crank arm of a bicycle and a moveable jaw for holding the crank arm against the housing.

Preferably, the rack further includes a second support member having a bottom end and a top end. The bottom end is pivotally connected to said base member and projects upwardly therefrom, the top end being connected to the top member. The second support member is adjacent the first support member.

A simplified preferred embodiment of the present invention provides a rack for securing bicycles having pedals and crank arms to a vehicle receiver hitch. The rack includes a base beam, a cross beam, first and second crank clamps, and first and second wheel rails. The base beam is secureable to the receiver hitch to extend rearwardly therefrom. The cross beam is attached to the base beam transverse to the longitudinal axis of the base beam. The first crank clamp includes a housing with a slot in the side thereof and a jaw member secured through an adjacent side of the housing, for securing a crank arm of a bicycle. The first crank clamp is attached to one end of said cross beam and projects upwardly therefrom. The slot in the side of housing allows a pedal to extend to the side of the housing. The first wheel rail is attached to the side of the base beam and extends substantially transversely therefrom. The second crank clamp includes a housing with a slot in the side thereof and a jaw member secured through an adjacent side of the housing, for securing a crank arm of a bicycle. The second crank clamp is attached to an opposite end of the cross beam from the first crank clamp and projects upwardly from the cross beam. The second wheel rail is attached to the side of the base beam and extends substantially transversely therefrom in a direction opposite to that of the first wheel rail.

The clamp housing preferably includes a cupping surface and a moveable jaw opposite the cupping surface, the crank arm being securable between the cupping surface and the moveable jaw.

As will be readily appreciated from the foregoing description, the present invention provides a unique support rack that easily mounts to existing trailer hitch sleeves, thus eliminating the need for attachment to a vehicle bumper. The rack allows unrestricted access to the vehicle interior through the doors at the rear of the vehicle when the bicycles are removed and maintains the bicycles in an upright position, firmly separated from each other and from the vehicle. The only contact of the bicycles with the rack is at the bicycle cranks and tires, thus avoiding any "marring" or other damage to the bicycles. The need to lift objects onto the roof of the vehicle is also avoided. The simplified construction of the frame members provide a sturdy and safe rack that is less costly to manufacture. The rack also provides an attachment point for securing a bicycle to the rack to hold it steady for maintenance and repairs. The unique crank clamps permit a user to load and unload bicycles.

BRIEF DESCRIPTION OF THE DRAWINGS

The foregoing and other features and advantages of the present invention will be more readily appreciated as the same becomes better understood from the detailed description, when considered in conjunction with the following drawings, wherein:

FIG. 9 is an isometric view of a preferred crank clamp rack of the present invention;

FIG. 10 is a top view of one of the clamps illustrated in FIG. 9; and

DETAILED DESCRIPTION OF THE PREFERRED EMBODIMENTS

The following detailed description begins with a background discussion of rack 300 specifically described in parent application Ser. No. 08/277,678 and illustrated in FIGS. 1–4. The description proceeds referring to FIGS. 4–11 with a discussion of the crank clamp racks of the present invention.

Figure 1:
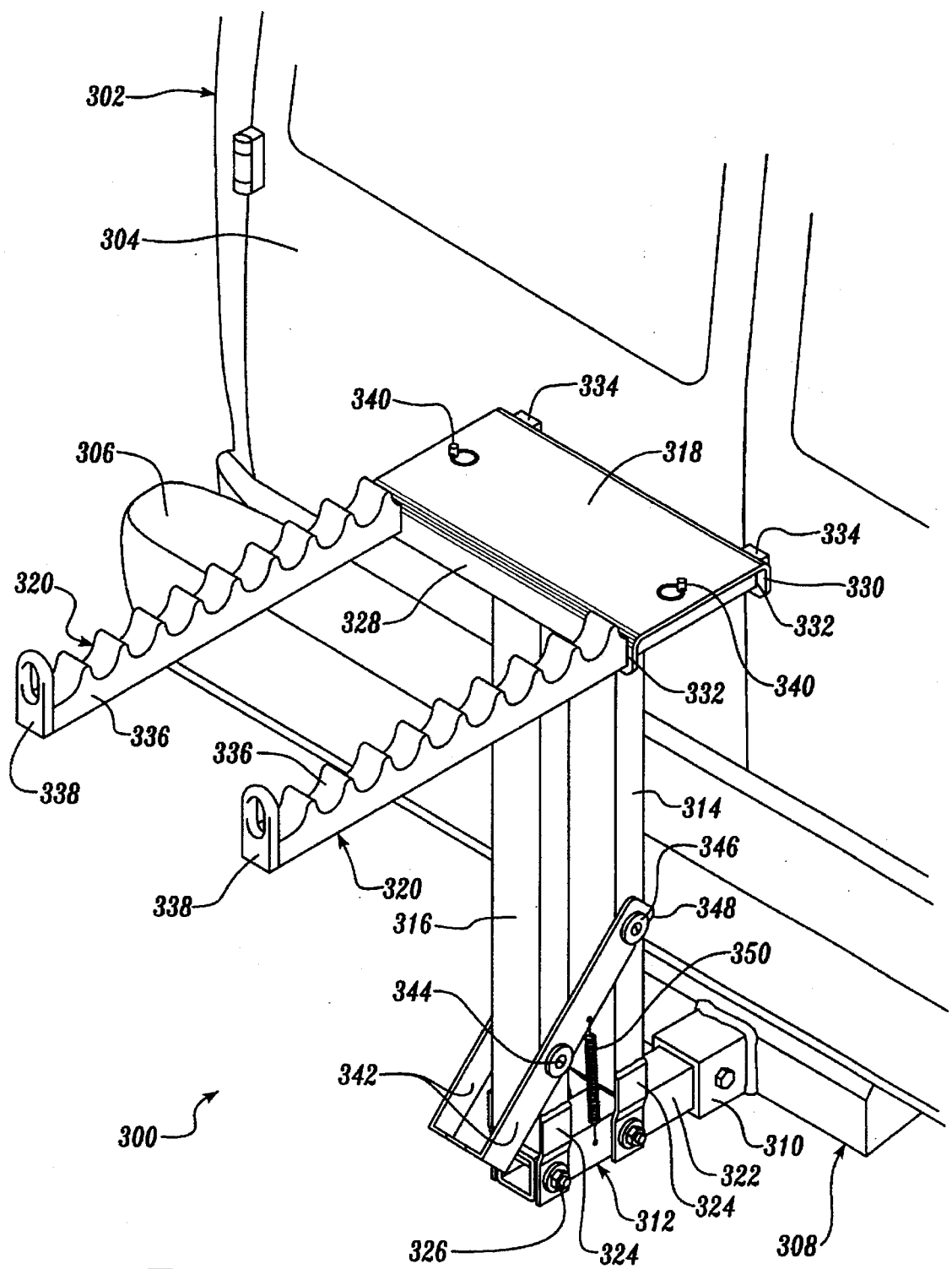
FIG. 1 is an isometric view of a rack having two upwardly extending beams.

Referring first to FIG. 1, a support rack 300 is provided for preferably carrying bicycles on the rear of a vehicle 302. Rack 300 is articulated such that it can move away from the rear end of the vehicle, while still holding bicycles, such that the doors 304, lift gate, tailgate, or other rearward access structures can be used. Vehicle 302 also includes a bumper 306 below which a receiver hitch 308 is attached to the frame of the vehicle. Receiver hitch 308 includes a hitch sleeve 310. Note that, while receiver hitch 308 is the preferred place to which rack 300 is mounted, other mounting means may be used to attach rack 300 to the rear of vehicle 302.

Rack 300 includes a base member 312, a forward beam 314, a rearward beam 316, a top member 318, and support arms 320. When coupled to receiver hitch 308, base member 312 is in a substantially horizontal position and extends in a longitudinal direction with respect to vehicle 302 rearward of receiver hitch 308. Base member 312 includes a tongue 322 that is slidably engaged within hitch sleeve 310. Base member 312 is constructed of a tube with a square cross-sectional shape having a width only slightly less than the inside width of hitch sleeve 310. The length of base member 312 is sufficient to extend within hitch sleeve 310 for attachment thereto and rearward of hitch sleeve 310 beyond bumper 306.

Forward and rearward beams 314 and 316 are also constructed of tubular metal. The cross-sectional shape of beams 314 and 316 is rectangular with the major axis of the cross section being transverse to the longitudinal axis of vehicle 302. Beams 314 and 316 extend in a generally upward direction from their pivotal attachments to base member 312. The bottom ends of beams 314 and 316 have beam connection plates welded thereto. Beam connection plates 324 each include two flat portions and an inwardly angled center portion. The upper flat portions of beam connection plates 324 are welded to the lateral sides of beams 314 and 316. The lower portions of beam connection plates 324 are pivotally secured with fasteners 326 to base member 312. Fasteners 326 may be standard bolts with nuts and washers attached to allow pivotal movement of beam connection plates 324 relative to base member 312. A beam connection plate 324 is attached to each side of beams 314 and 316, and a bolt passes through plates 324 and through base member 312.

The top ends of beams 314 and 316 are pivotally secured to top member 318, as explained in more detail below, with reference to FIGS. 2 and 3. The space between the top pivotal connections of beams 314 and 316 is equal to the spacing between the bottom pivotal connections of beams 314 and 316 to base member 312. Thus, a four-bar linkage results with the bars being base member 312, forward and rearward beams 314 and 316, and top member 318. Since a parallelogram four-bar linkage is constructed, and since top member 318 lies in a generally horizontal plane, as beams 314 and 316 pivot rearwardly about base member 312, top member 318 maintains its horizontal orientation, while moving rearwardly and downwardly relative to vehicle 302. This motion can be seen with more clarity with reference to FIGS. 2 and 3.

Top member 318 includes a top flat plate-like portion, which is in a generally rectangular configuration, with a major axis transverse to the longitudinal axis of vehicle 302.

A rearward flange 328 is formed along the rearward side of top member 318 and projects downwardly therefrom. A forward flange 330 likewise projects downwardly from the forward edge of top member 318. Arm apertures 332 are provided at both ends of both flanges 328 and 330. Arm apertures 332 are preferably square and hold support tubes 334 therein. Support tubes 334 are the main structural components of support arms 320. Support tubes 334 are preferably square in cross section and extend in a longitudinal direction from top member 318. The rearward ends of support tubes 334 are slidably received within arm apertures 332 such that only a small portion of support tubes 334 extends forward of forward flange 330. Ribbed covers 336 are preferably secured around the portions of support tubes 334, which project rearwardly of-rearward flange 328. Ribbed covers 336 are made of a soft, rubber-like material such that they will not mar the surface of any bicycles held thereon. Covers 336 include upwardly projecting bumps that hold bicycles in defined locations along support arms 320. As with the embodiments discussed above, support arms 320 include stop plates 338 at their rearwardmost ends. Stop plates 338 include apertures through which a lock or other tie-down member may be secured. Stop plates 338 project upwardly from support tubes 334. Holes are provided at corresponding locations in top member 318 and the forward ends of support tubes 334 to receive detent pins 340. Pins 340 include rings on their ends and ensure that support arms 320 remain in place within arm apertures 332.

Lock arms 342 are provided to hold forward and rearward beams 314 and 316 in an upright position until the user desires to lower support arms 320. Lock arms 342 are L-shaped arms with the lower portions of the arms extending inwardly toward each other and the upper portions of the arms being connected to first rearward beam 316 and then at the uppermost end, forward beam 314. A pivot fastener 344 secures each of lock arms 342 to rearward beam 316 near the center of lock arms 342. Pivot fastener 344 is preferably a bolt that extends through rearward beam 316 and includes spacers with large flanges and a lock nut at its outer end to allow lock arms 342 to freely pivot. A lock fastener 346 is secured to forward beam 314 at the upper end of lock arms 342. Lock fastener 346 is similarly attached through forward beam 314 and includes spacers with flat heads (flanges) to provide a location for the end of lock arms 342 to rest and secure beams 314 and 316 from movement. A lock notch 348, best seen in FIG. 3, is cut within the lower side of the upper end of lock arms 342. Lock notch 348, when beams 314 and 316 are in upright positions, rests over lock fastener 346. Cylindrical helical springs 350 are attached between lock arms 342 and base member 312. The upper ends of springs 350 are secured between pivot fastener 344 and lock fastener 346, while the lower ends are secured between the connections of beam connection plates 324 on each side of base member 312. Spring 350 biases the upper end of lock arms 342 in a downward direction such that lock notches 348 remain secure over lock fastener 346.

Figure 2:
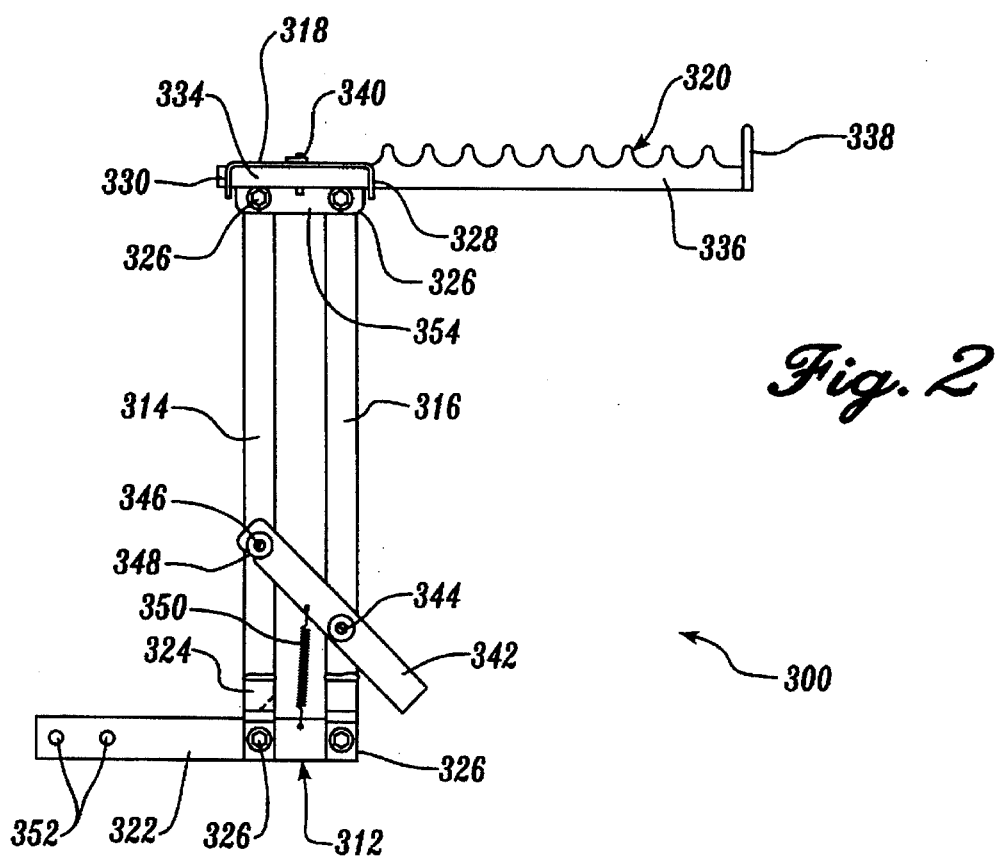
FIG. 2 is a side elevational view of the rack illustrated in FIG. 1 shown in an upright position.
Figure 3:
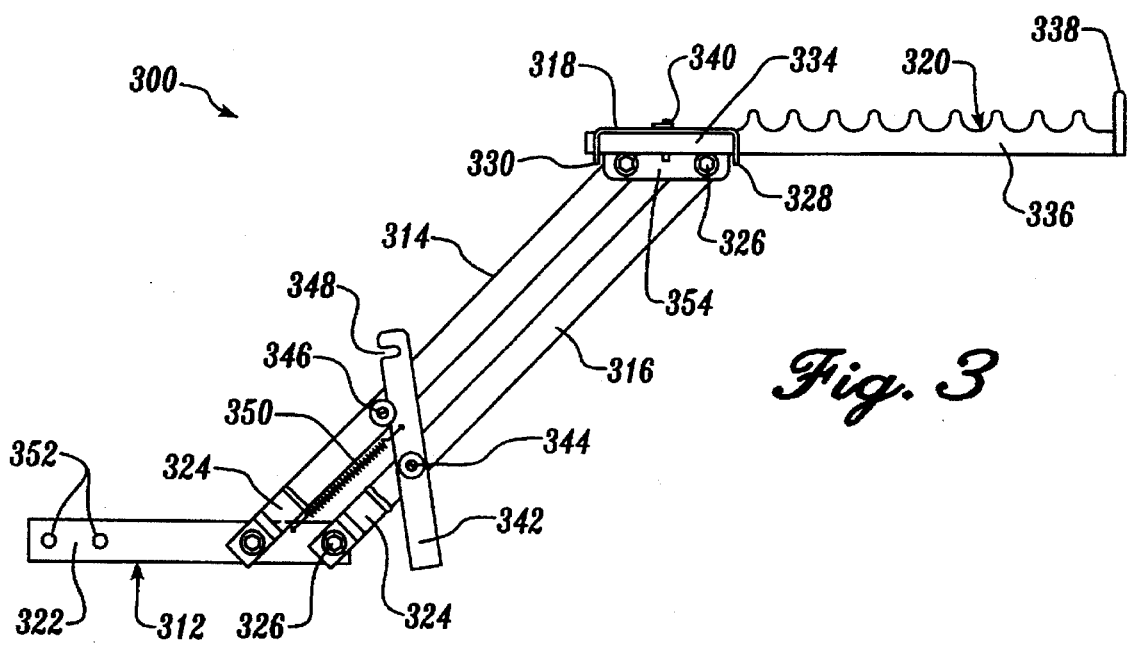
FIG. 3 is a side elevational view of the rack illustrated in FIG. 1 shown in a lowered position.

FIGS. 2 and 3 illustrate the movement of rack 300 from an upright position adjacent the rear doors 304 of vehicle 302 to a lowered position out of the way of doors 304, such that they may be opened without rack 300 interfering with their movement. This movement is also essential for the opening of other vehicles, which may include lift gates, tailgates, or other rearwardly opening structures. Further details of rack 300 are also better illustrated in FIGS. 2 and 3. Bolt apertures 352 are shown in tongue 322. Bolt apertures 352 perform the function of securing tongue 322 to sleeve 310. Beam top mounts 354 are also illustrated. Beam top mounts 354 are downward projections welded to the underside of top member 318. Beam top mounts 354 provide locations to which beams 314 and 316 may be secured at their upper ends. As discussed above, the space between the attachments of forward and rearward beams 314 and 316 to beam top mounts 354 is equal to the spacing between the lower ends of beams 314 and 316 to base member 312. Beam top mounts 354 are generally rectangular in shape and lie within parallel vertical planes separated by a distance slightly greater than the width of beams 314 and 316.

To move support arms 320 from their uppermost position as illustrated in FIG. 2 to their lowered position as illustrated in FIG. 3, the user simply grasps support arms 320 and pushes slightly in a forward direction while pushing down on the lower ends of lock arms 342 with his or her foot. Only slight forward movement is required since lock fastener 346 simply needs to be freed from lock notch 348 as the upper ends of lock arms 342 swing upwardly against the biasing force of springs 350. Once this occurs, the user can pull support arms 320 rearwardly and allow lock arms 342 to glide along lock fastener 346 while support arms 320 move rearwardly and downwardly with the pivotal movement of beams 314 and 316. As explained above, support arms 320 retain their horizontal orientation at all times due to the parallelogram four-bar linkage configuration of beams 314 and 316, base member 312, and beam top mounts 354. Thus, the bicycles being carried on support arms 320 retain their position with respect to support arms 320 at all times. Therefore, the bicycles need not be removed from rack 300 and are not scraped or damaged in any way. Once the lower end of forward beam 3 14 contacts the top surface of base member 312, downward movement of support arms 320 stops. The user can now freely open the rear end of vehicle 302 and have easy access thereto.

To resecure rack 300 in its upright position near the rear end of vehicle 302, the user simply pushes forwardly and upwardly on support arms 320 such that beams 314 and 316 swing toward vehicle 302. This movement continues until notch 348 is pulled over lock fastener 346 by spring 350. The user can then pull slightly rearwardly on support arms 320 to securely fit lock fastener 346 within the uppermost part of lock notch 348. Since lock arms 342 are not perpendicular to beams 314 and 316, they impede any movement once they are secured to both pivot fastener 344 and lock fastener 346. The separation of lock arms 342 from one another (i.e., the fact that they are not connected at their lowermost ends), provides a factor of safety, since both lock arms 342 would have to be simultaneously released in order for any movement of rack 300 to take place relative to receiver hitch 308. However, the lower ends of lock arms 342 are angled inwardly such that the user may release the arms simply by the application of one foot to the lower ends of the arms.

Figure 4:
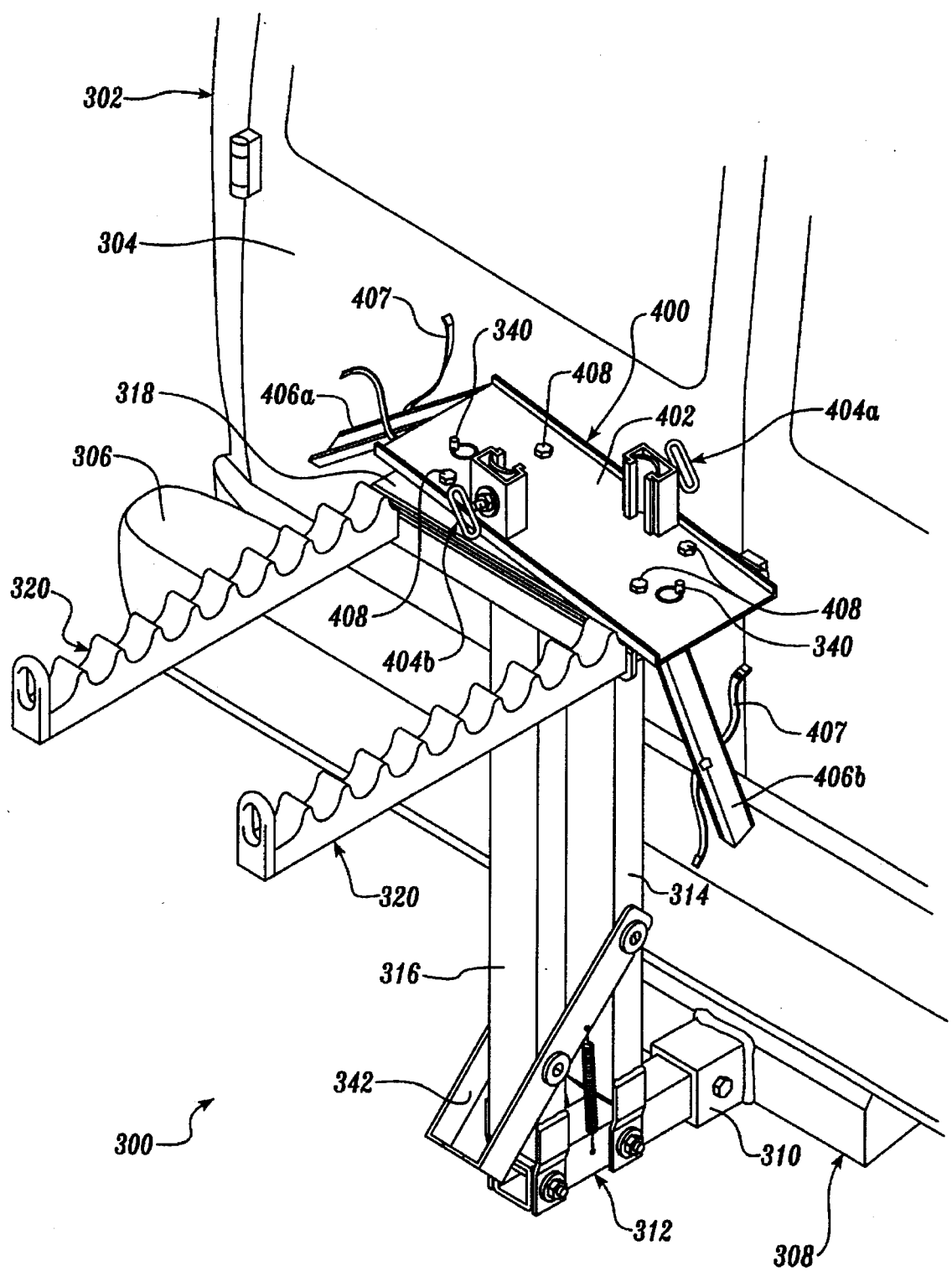
FIG. 4 is a perspective view of the rack illustrated in FIG. 1 having a crank clamp attachment secured to the top thereof.
Figure 5:
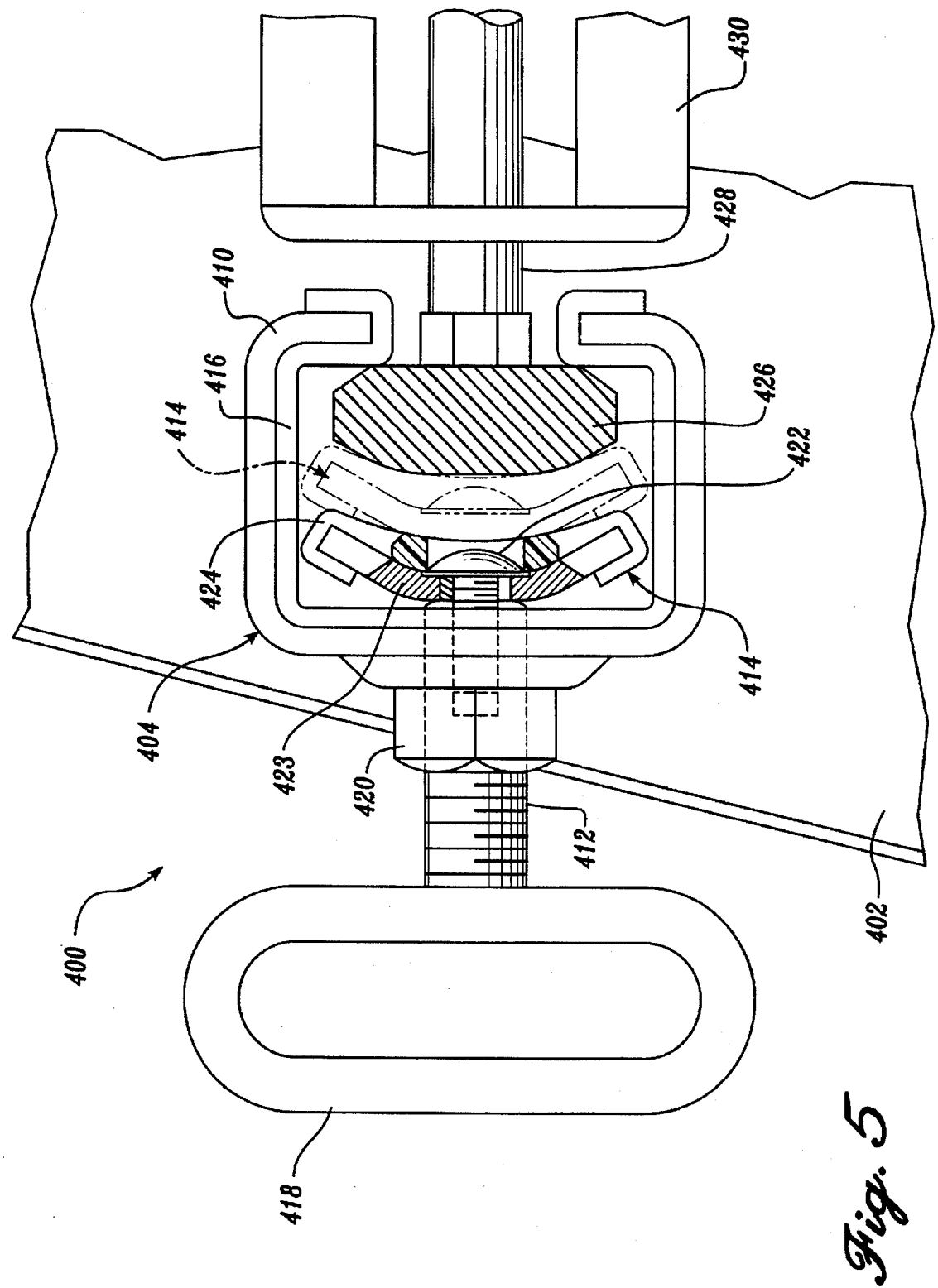
FIG. 5 is a top view of a crank clamp illustrated in FIG. 4.
Figure 6:
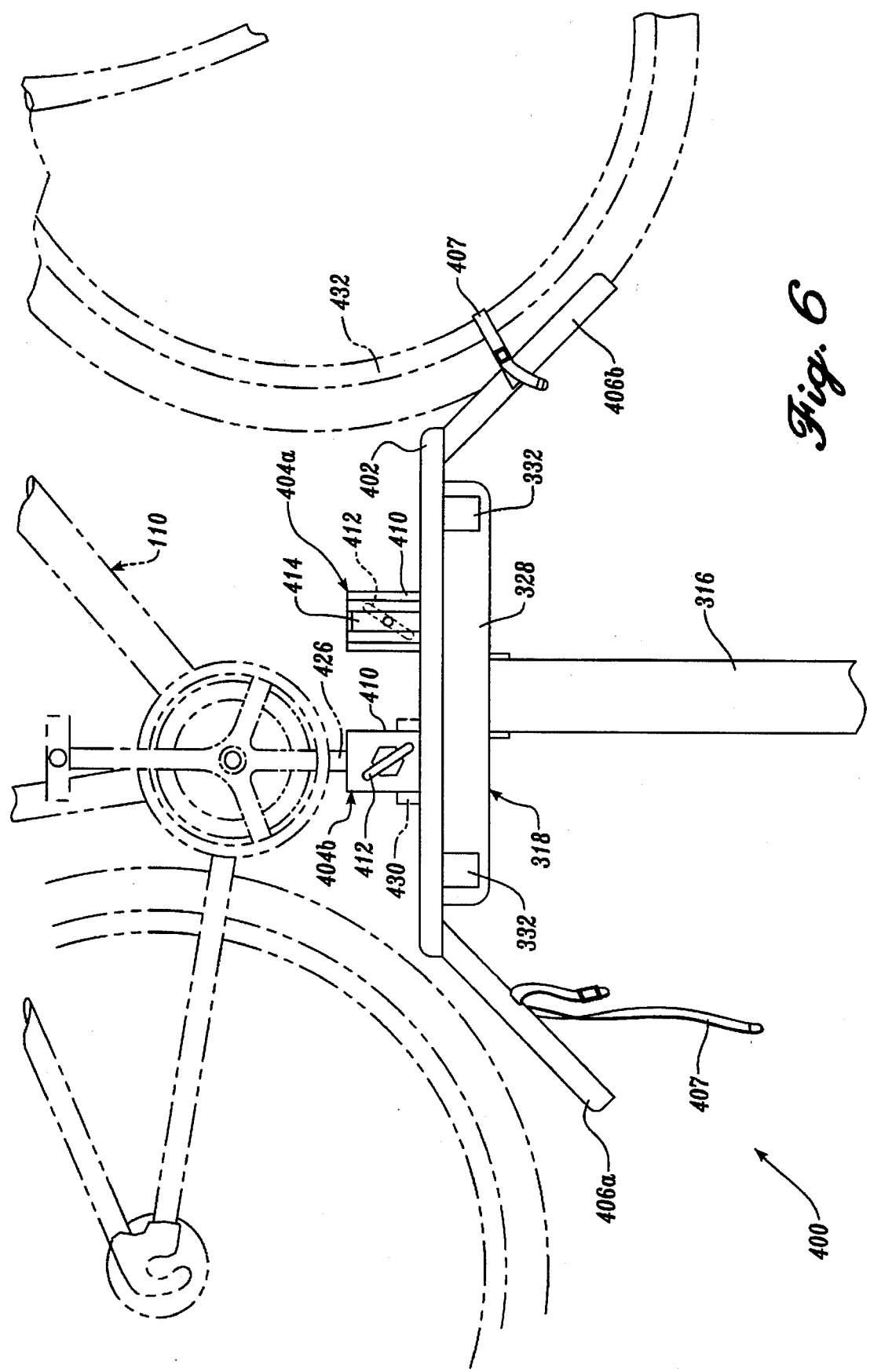
FIG. 6 is a rear elevational view of the rack illustrated in FIG. 4 having a bicycle held by one of the crank clamps and having the support arms removed.

The present invention, including four different preferred embodiments, will now be described with reference to FIGS. 4–11. Referring first to FIGS. 4–6, a crank clamp attachment 400 is provided that attaches to the top surface of top member 318 of rack 300. Crank clamp attachment 400 allows rack 300 to carry, in the preferred embodiment, two additional bicycles. Crank clamp attachment 400 includes a support plate 402, crank clamps 404a and 404b, and wheel rails 406a and 406b. Support plate 402 is in the shape of a parallelogram with the lateral sides being substantially collinear with the lateral sides of top member 318. Support plate 402 rests directly on top of top member 318. The forward and rearward sides of support plate 402 run at slight angles to the forward and rearward sides of top member 318.

Thus, the left forward corner of support plate 402 extends forward of the left rearward corner of top member 318 and the right rearward corner of support plate 402 extends rearwardly of the right rearward corner of top member 318. The forward and rearward sides of support plates 402 include upwardly turned flanges. Crank clamp 404a is welded to the top surface of support plate 402 near the rear edge of support plate 402 just to the right of center. The position of crank clamp 404b is the mirror image of the position of crank clamp 404a. Thus, crank clamp 404b is positioned near the rearward edge of support plate 402 just to the left of center.

Wheel rail 406a is secured to the left forward corner of support plate 402. Wheel rail 406b is secured to the right rearward corner of support plate 402. Both rails are constructed of angled metal that is welded directly to the bottom surface of support plate 402. Wheel rails 406a and 406b extend outwardly and slightly downwardly from the corners of support plate 402. Straps 407 are secured to wheel rails 406a and 406b for securing a bicycle wheel 432. Preferably, the front wheel of a bicycle is secured within each of wheel rails 406a and 406b.

Fasteners 408 extend through support plate 402 and top member 318 to secure crank clamp attachment 400 to rack 300. Preferably, four fasteners 408 are used.

The details of crank clamps 404a and 404b can best be understood with reference to FIG. 5. Crank clamps 404a and 404b include clamp housings 410, clamp screw 412, and clamp head 414. Clamp screw 412 includes a threaded portion and a handle 418, which is used to advance or retract screw 412 relative to clamp housing 410. Clamp housing 410 has a cross-sectional C shape that projects vertically upward from support plate 402. A housing liner 416 is held around the inner surfaces of clamp housing 410. Housing liner 416 provides a nonabrasive surface to which a crank arm 426 may be secured. A nut 420 with internal threads is welded to the back side of housing 410 for engaging screw 412. Clamp head 414 is disposed within clamp housing 410 on the end of screw 412. A head screw 422 extends through clamp head 414 and into the end of screw 412. Clamp head 414 has a slightly curved shape to cup crank arm 426 and curve around its contours. A head liner 424 is provided on the inwardly facing surface of clamp head 414 to provide an interface between clamp head 414 and crank arm 426.

As illustrated in FIG. 5, crank arm 426 extends downwardly within the upwardly projecting clamp housing 410 with its pedal shaft 428 extending between the ends of the C-shaped housing. The ends of the "C" are thus too close together to allow crank arm 426 to move horizontally but are far enough apart to allow pedal shaft 428 to be disposed therebetween. Pedal 430 thus resides on the outside of clamp housing 410 adjacent the opening. Clamp head 414 is screwed into position to engage crank arm 426 and lock it against housing 410 for secure attachment of bicycle 110 (as shown in phantom).

FIG. 6 illustrates the attachment of bicycle 110 to crank clamp attachment 400. Bicycle 110 is lifted and crank arm 426 is placed within the top of clamp housing 410. FIG. 6 illustrates a bicycle 110 being secured within the rearwardmost crank clamp 404b. The forward or left crank arm 426 is placed within crank clamp 404b such that the bicycle 110 is further removed from crank clamp 404a so that, when two bikes are loaded onto crank clamp attachment 400, no interference between the two exists. Bicycle wheel 432, preferably the front wheel, is placed within the "V" of wheel rail 406b. Strap 407 is then secured around the rim of bicycle wheel 432. Clamp screw 412 is then tightened by rotating handle 418 to secure clamp head 414 against crank arm 426. Crank clamp attachment 400 is then ready to transport bicycle 110 or to receive another bicycle to be secured to crank clamp 404a and wheel rail 406a. Either bike can be loaded first, since rack 300 can be lowered for easy access to the inside bike. Since crank clamp 404b securely holds crank arm 426 from movement in any direction, be it lateral, longitudinal, or vertical, bike 110 remains secure by one more attachment point to wheel 432 with strap 407. The only movement of bicycle 110 without the attachment to wheel 432 would be rotational movement about the bottom bracket. However, with bicycle wheel 432 secured to rail 406b the entire bicycle is secure against movement.

The attachment of crank clamp attachment 400 to the top of top member 318 allows rack 300 to carry two additional bicycles. These bicycles are carried forward of the bicycles carried on arms 320 and, thus, the bending force on base member 312 is kept to a minimum. Also, if van or sport/utility type of vehicle is used, the tops of bicycles 110 loaded on crank clamp attachment 400 may extend only slightly above the top of vehicle 302. Thus, all bicycles are kept substantially within the rearward draft zone of vehicle 302 for minimal wind resistance.

Figure 7:
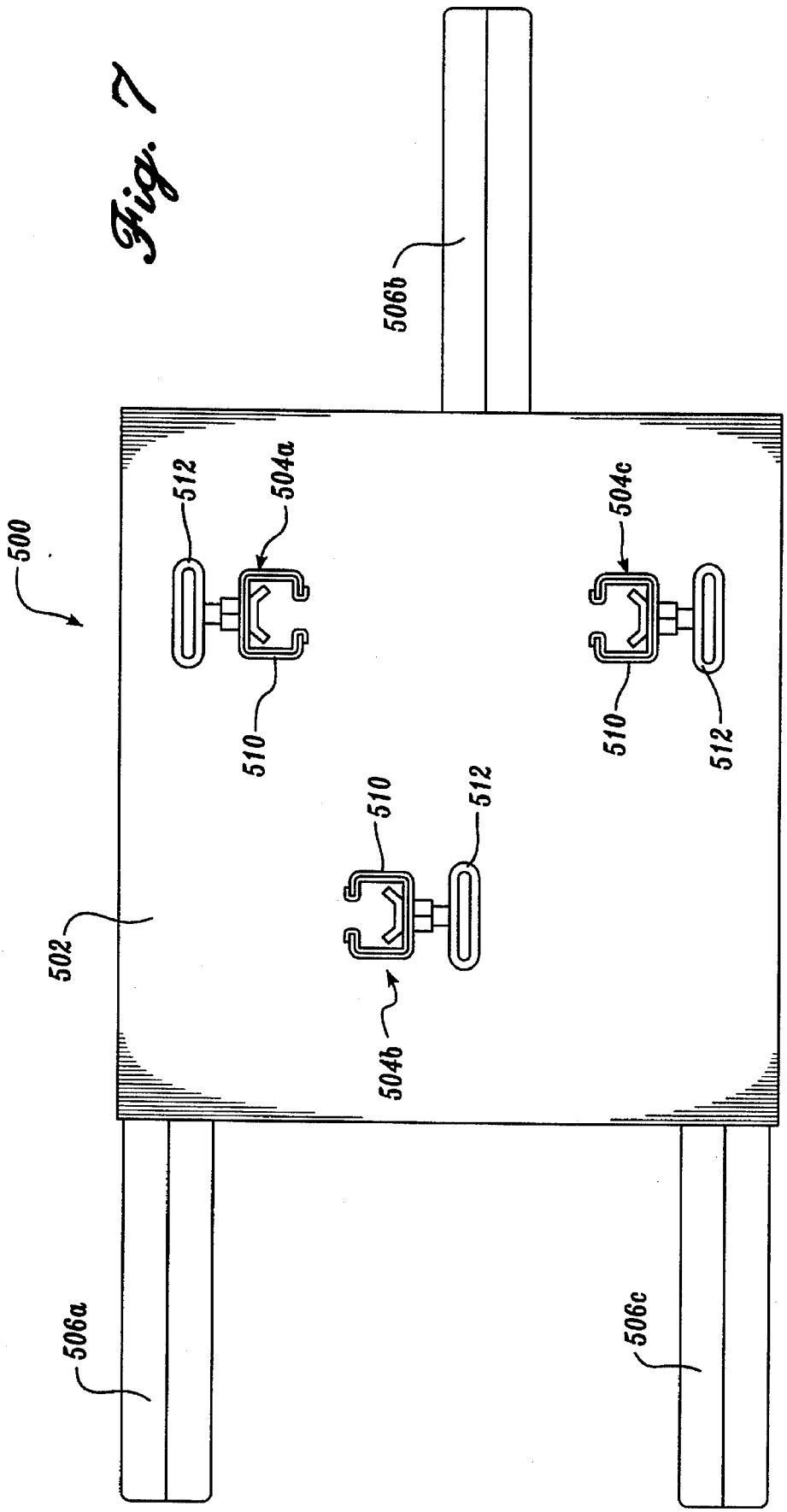
FIG. 7 is a top view of an alternate embodiment of the crank clamp attachment having three clamps.

An alternate embodiment of crank clamp attachment 500 is illustrated in FIG. 7. This embodiment includes three crank clamps 504a–504c. Clamps 504a and 504b are similar to 404a and 404b and wheel rails 506a and 506b are similar to wheel rails 406a and 406b. However, crank clamp attachment 500 is extended rearwardly such that an additional crank clamp 504c is provided to secure one additional bicycle thereon. An additional wheel rail 506c is also provided. In this embodiment, two bicycles face one direction while one bicycle meshes between the two to face the opposite direction. Crank clamp 504c faces the same direction as crank clamp 504b but is spaced farther from crank clamp 504b than crank clamp 504b is spaced from crank clamp 504a. Note that support plate 502 could be further extended and additional clamps added for transporting additional bikes.

Figure 8:
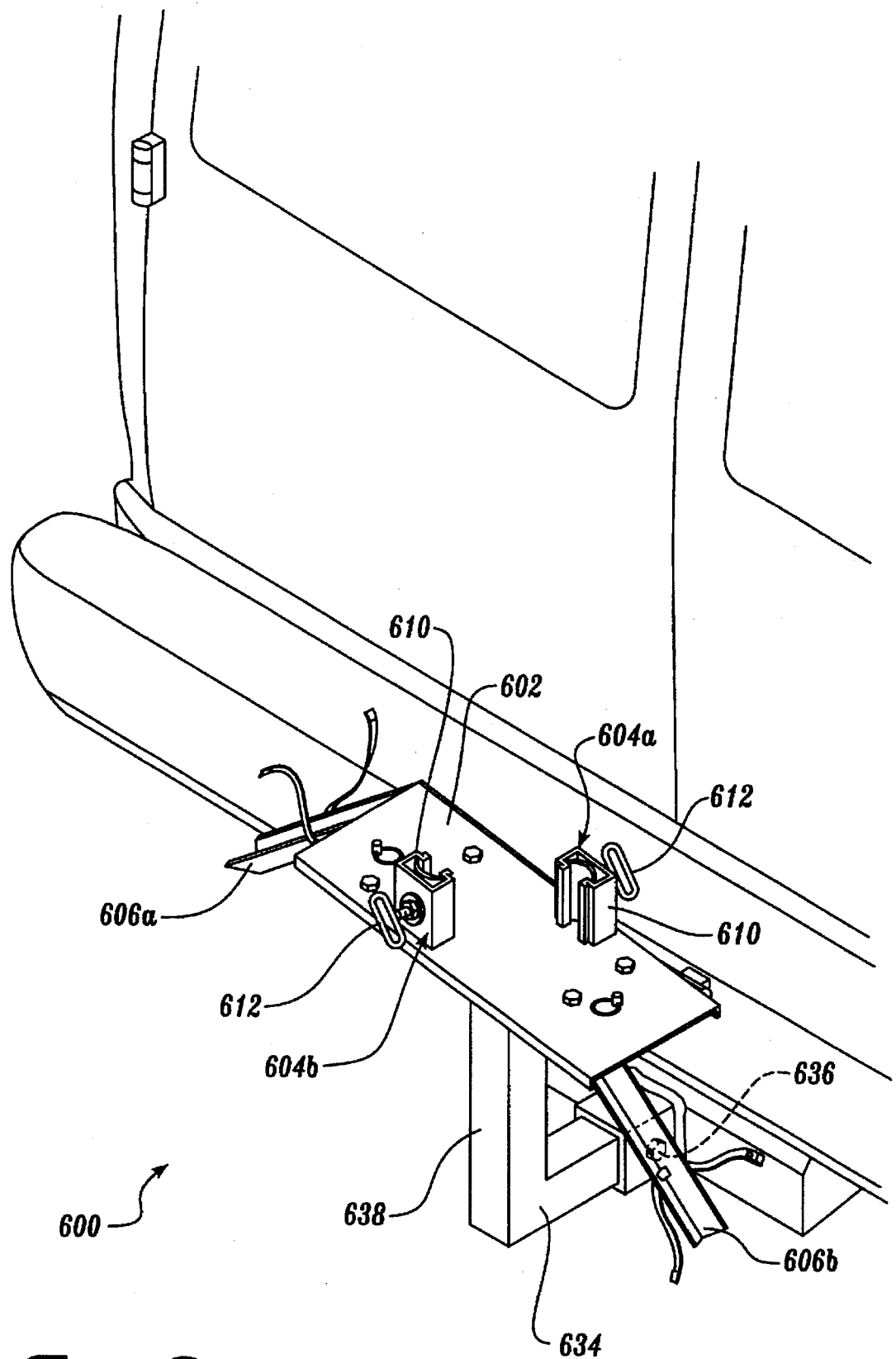
FIG. 8 is a perspective view of an alternate embodiment of the crank clamp attachment mounted to a simplified base structure.

Another alternate embodiment is illustrated in FIG. 8. A low rack 600 is provided that includes a bike rack attachment that is nearly identical to crank clamp attachment 400. Low rack includes a support plate 602, crank clamps 604a and 604b, and wheel rails 606a and 606b. Each crank clamp includes a clamp housing 610 and a clamp screw 612. However, the bottom of support plate 602 is secured to an upright beam 638. Upright beam 638 extends downwardly from support plate 602 a short distance and is welded or otherwise connected to base member 634. Base member 634 is constructed similar to base member 312 and slides within sleeve 310 of receiver hitch 308. Bolt apertures 636 are provided to secure base member 634 to sleeve 310. Upright beam 638 does not articulate or otherwise move relative to base member 634. Since the bicycles held on low rack 600 are held in a higher position than those held on support arms 320, the height of upright beam 638 does not need to be as great as that of beams 314 and 316.

Low rack 600 provides an inexpensive and simpler alternative to other racks provided. Bicycles may be easily loaded and removed as described above with reference to FIG. 6. Low rack 600 is small and lightweight enough to be easily removed and replaced from receiver hitch 308.

Figure 11:
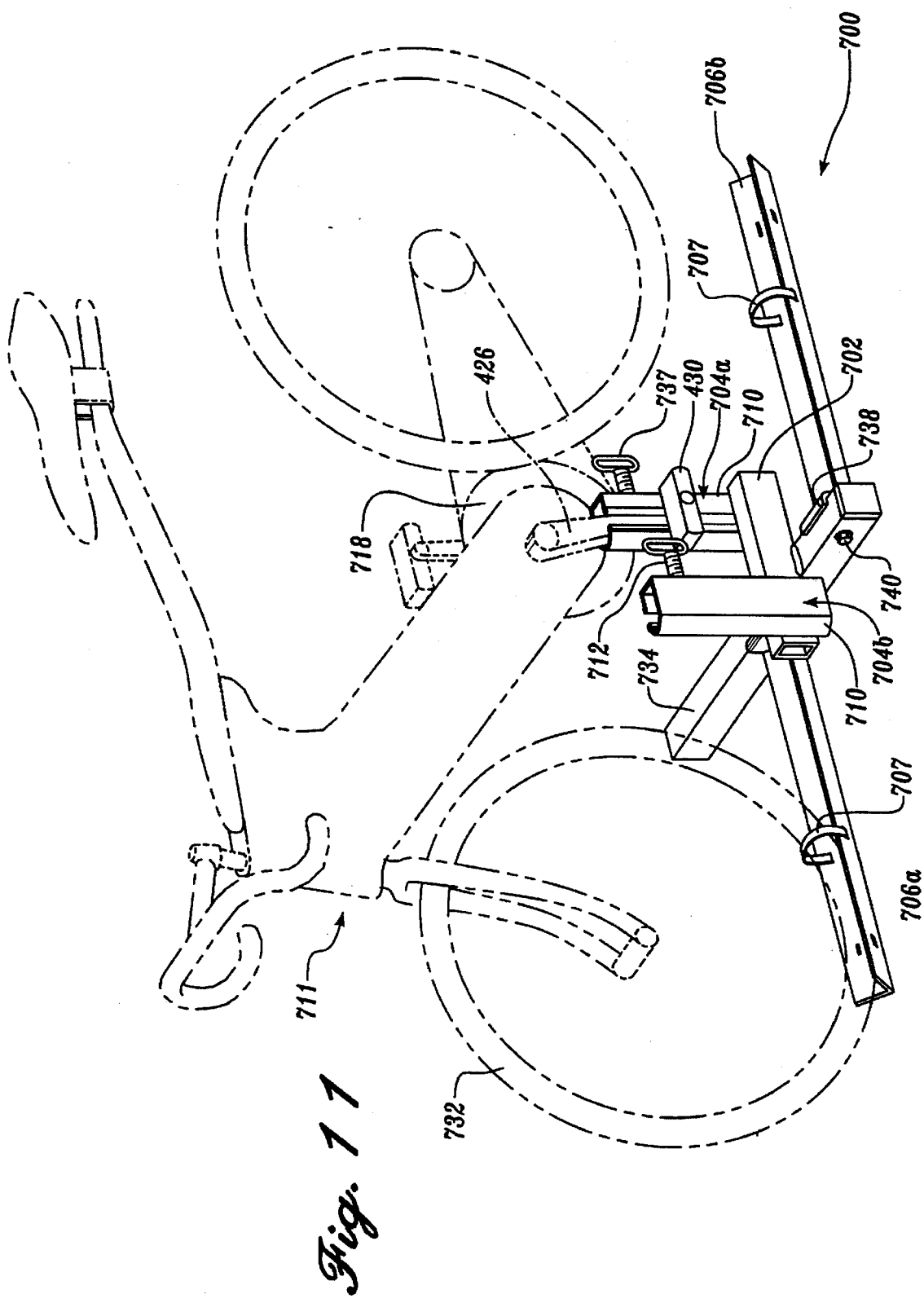
FIG. 11 is a perspective view of the rack of FIG. 9 carrying a bicycle.

Finally, a preferred embodiment of a side screw crank clamp rack 700 is illustrated in FIGS. 9–11. This preferred embodiment is simpler still than rack 600, yet includes all of the same advantages. Because of the differences in construction other advantages over the previous racks discussed are obtained.

Rack 700 includes a base beam 734, a support beam 702, crank clamps 704a and b, and wheel rails 706a and b. Base beam 734 includes a forward end that is adapted to be inserted within the receiver hitch of a vehicle. Bolt apertures 736 are provided for secure attachment of base beam 734 to the hitch. Base beam 734 is preferably made up of square steel tubing. A plastic end cap 735 is preferably placed on the rearward end of base beam 734. Base beam 734 extends longitudinally rearward of the vehicle to which it is coupled.

Support beam 702 is attached near the rearward end of base beam 734. Support beam 702 is preferably welded to base beam 734. Support beam 702 is also preferably constructed of metal tubing with a rectangular cross-sectional shape. The width and height of support beam 702 is preferably somewhat smaller than that of base beam 734. Support beam 702 is attached to the top side of base beam 734 about a fourth of the distance from the rearward end to the forward end of base beam 734. Support beam 702 is oriented transverse to the longitudinal axis of base beam 734. The length of support beam 702 is somewhat less than that of base beam 734. The length is dependent upon the preferred spacing of crank clamps 704a and b.

Crank clamps 704a and b are attached at the ends of support beam 702. Crank clamp 704a is preferably welded to the forward face of support beam 702 and projects vertically upward therefrom. Crank clamp 704b is preferably welded to the rearward face of the left end of support beam 702 and projects vertically upward therefrom.

Each of crank clamps 704a and b are similar in construction except that the opening for the pedal 430 of crank clamp 704a faces rearwardly while the opening of crank clamp 704b faces forwardly. This is due to the fact that, as discussed above, the bicycle placed on the forwardmost crank clamp 704a would preferably have its left crank arm 426 placed within crank clamp 704a, with the front wheel of the bicycle extending to the left of base beam 734. In this position, the chain rings 718 of a bicycle, such as that shown in FIG. 11 as bicycle 711, would be on the opposite side from crank arm 426. Thus, no interference would be likely between chain rings 718 and crank clamp 704a. The bicycle placed in crank clamp 704b would face the opposite direction, thus the openings for pedals 430 face each other in this preferred embodiment. Crank clamps 704a and b are somewhat taller than previously discussed crank clamps 604a and b since they must extend upwardly from base beam 734 and support beam 702 without being elevated, for example with rack 600, by upright beam 638.

Crank clamps 704a and b are preferably each made of sheet metal that is bent into a generally C-shaped clamp housing 710 with an insert 709 welded into the opening of the lower portion of the C-shape. Thus, the upper portion forms the C-shape with a slot 713, from which the pedal 430 extends from crank arm 426. Thus, the shaft of pedal 430 rests upon insert 709 when placed within clamp housing 710. A housing liner 716 is placed within clamp housing 710 to protect the surfaces of crank arm 426 from being scratched or otherwise marred when inserted into crank clamp 704a or b. Crank clamp 704a and b also include a clamp screw 712 and a nut 720 into which clamp screw 712 is engaged. As seen in FIG. 10, clamp screw 712 also includes handle 737 and clamp head 714. Clamp head 714 is attached to clamp screw 712 with a general ball and socket arrangement, such that clamp head 714 is allowed to slightly pivot on the end of clamp screw 712. Nut 720 is welded to the outer surface of crank clamp housing 710. Clamp head 714 is within clamp housing 710 and is used to force crank arm 426 against a cupping surface 715 of clamp housing 710 and housing liner 716.

Wheel rails 706a and b are provided on each side of base beam 734. Wheel rails 706a and b have a V-shaped cross section and extend preferably horizontally from their attachment to base beam 734. Each of Wheel rails 706a and b include a rail mount 738 welded to the inner end thereof and a rail fastener that extends through rail mount 738 and through base beam 734 for removable attachment of wheel rails 706a and b. Thus, wheel rails 706a and b can be removed for compact storage or shipment. Each of wheel rails 706a and b also includes a strap 707 to secure the wheel 732 of bicycle 711. Additional straps may also be used.

As illustrated in FIG. 11, bicycle 711 is lifted and crank arm 426 is placed within clamp housing 710 with pedal 430 extending out of clamp housing 710 through slot 713. Wheel 732 is then strapped to wheel rail 706a with strap 707. Clamp screw 712 is then advanced within clamp housing 710 to press clamp head 714 against the side of crank arm 426. Movement of clamp head 714 forces crank arm 426 against cupping surface 715 of housing liner 716 and pedal 430 against the side of slot 713. Thus, cupping surface 715, as well as slot 713 securely hold crank arm 426 from movement. The securement of crank arm 426 in this manner allows only a single degree of freedom of bicycle 711. This final degree of freedom is eliminated once wheel 732 is secured to wheel rail 706a with strap 707.

Note that as clamp screw 712 biases crank arm 426 against housing liner 716, crank arm 426 becomes slightly tilted from vertical. The angle of crank arm 426 is accommodated by the pivotal connection of clamp head 714 on the end of clamp screw 712 (see FIG. 10). Note that bicycle 711 is still maintained in a substantially vertical orientation since crank arm 426 is not tilted substantially laterally.

Once bicycle 711 is in place, the same steps are taken to secure a second bicycle to crank clamp 704b with the front of the bicycle facing the opposite direction. In this manner, bicycle 711 cannot swing or move substantially in any direction and it is thus protected from contact with other bicycles or with the vehicle. Also, the only contact of bicycle 711 with rack 700 is at the wheel where it contacts wheel rail 706a and strap 707 and crank arm 426 within housing liner 716.

Several other advantages are also achieved with rack 700. The clamping force of screw 712 pushes crank arm 426 against cupping surface 715 for a secure engagement. Virtually any size or type of crank can be cradled within cupping surface 715 without fear of crank arm 426 slipping through slot 713 inadvertently. Once rack 700 is placed within a receiving hitch of a vehicle, the tops of crank clamps 704a and b are preferably below the top surface of the vehicle bumper. Therefore, with bicycles removed from rack 700 the lift gate, rear doors, or tail gate of the vehicle can be opened and used for accessing the other vehicle contents. The rack is also small, light weight, includes few parts, and is easy to manufacture. The rack also provides the advantages of the other racks disclosed herein in that bicycles need not be lifted to the top of the vehicle. The bikes remain in the rear draft zone for improved fuel economy.

While preferred embodiments of the invention have been described in the context of loading and unloading a bicycle on a van, it is to be understood that the present invention will have other applications, such as on campers or cars. Furthermore, it is contemplated that various changes may be made thereto without departing from the spirit and scope of the invention. For example, support plate 402 may be provided with a second wheel support structure similar to the front wheel rails 406 described above or another type of bicycle stabilizer may be used. Alternative embodiments of rack 700 may include clamps and rails for additional bicycles, embodiments to be secured within a pickup bed, in front, or on top of a vehicle. Consequently, the invention can be practiced otherwise than as specifically described herein.

The embodiments of the invention in which an exclusive property or privilege is claimed are defined as follows:

1. A support rack for carrying articles behind a vehicle having a forward end and a rearward end, the rack comprising:
   (a) a base member securable to the rearward end of the vehicle to project rearwardly from the vehicle;
   (b) a forward beam pivotally connected to said base member at a first pivotal connection and projecting upwardly therefrom;
   (c) a rearward beam pivotally connected to said base member at a second pivotal connection and projecting upwardly therefrom, said rearward beam being disposed rearwardly of said forward beam;
   (d) a top member pivotally connected to said forward beam at a third pivotal connection and pivotally connected to said rearward beam at a fourth pivotal connection; the distance between the first and third pivotal connections being substantially equal to the distance between the second and fourth pivotal connections, and the distance between the third and fourth pivotal connections being substantially equal to the distance between the first and second pivotal connections;
   (e) lock means for releasably locking said forward beam and said rearward beam in upright positions above said base member; and
   (f) a crank clamp attachment coupled to the top of said top member, said crank clamp attachment including a support member coupled to said top member; and a first crank clamp arranged and configured to secure a crank arm of a bicycle, said crank clamp being affixed to said support member.

2. The support rack of claim 1, wherein said crank clamp attachment further comprises a first wheel rail for securing a wheel of the bicycle held by said crank clamp, said wheel rail being affixed to said support member.

3. The support rack of claim 2, further comprising rearwardly extending support arms coupled to said top member.

4. The support rack of claim 2, wherein said first crank clamp includes an upwardly projecting C-shaped housing to receive the crank arm and a screw engaged within the back of the housing to clamp the crank arm against the housing.

5. The support rack of claim 2, wherein said crank clamp attachment further comprises a second crank clamp arranged and configured to secure a crank arm of a bicycle, said second crank clamp being affixed to said support member and spaced from said first crank clamp; said crank clamp attachment further comprising a second wheel rail for securing a wheel of the bicycle held by said second crank clamp, said second wheel rail being affixed to said support member and spaced from said first wheel rail.

6. The support rack of claim 5, wherein said crank clamp attachment further comprises a third crank clamp arranged and configured to secure a crank arm of a bicycle, said third crank clamp being affixed to said support member and spaced from said first and said second crank clamps; said crank clamp attachment further comprising a third wheel rail for securing a wheel of the bicycle held by said third crank clamp, said third wheel rail being affixed to said support member and spaced from said first and second wheel rails.

7. The support rack of claim 5, wherein said support member comprises a plate secured to said top member, said plate having forward, rearward, left, and right edges, the intersections of said edges forming corners, said wheel rails being attached at opposite corners of said plate.

8. A crank clamp assembly for holding bicycles behind a vehicle, said crank clamp assembly comprising:
   an attachment structure coupleable to the vehicle;
   a support member attached to said attachment structure; and
   a first crank clamp (1) including an upwardly projecting C-shaped housing arranged and configured to receive a crank arm of a bicycle and (2) a screw engaged within the back of the housing to clamp the end of the crank arm against the housing, said first crank clamp being affixed to said support member.

9. The crank clamp assembly of claim 8, wherein said attachment structure comprises a base member for engagement with a vehicle hitch and a beam affixed to said base member and extending upwardly therefrom, said support member being affixed to said beam.

10. The crank clamp assembly of claim 8, further comprising a first wheel holddown for securing a wheel of the bicycle held by said first crank clamp, said first wheel holddown being affixed to said support member.

11. The crank clamp assembly of claim 10, further comprising rearwardly extending support arms coupled to said support member.

12. The crank clamp assembly of claim 10, wherein said attachment structure comprises a base member for engagement with a vehicle hitch and a beam attached to said base member and extending upwardly therefrom, said support member being attached to said beam.

13. The crank clamp assembly of claim 12, wherein said beam is fixedly secured to said base member.

14. The crank clamp assembly of claim 10, further comprising a second crank clamp arranged and configured to secure a crank arm of a bicycle, said second crank clamp being affixed to said support member and spaced from said first crank clamp; and a second wheel holddown for securing a wheel of the bicycle held by said second crank clamp, said second wheel holddown being affixed to said support member and spaced from said first wheel holddown.

15. The crank clamp assembly of claim 14, wherein said attachment structure comprises a base member for engagement with a vehicle hitch and a beam attached to said base member and extending upwardly therefrom, said support member being attached to said beam.

16. The crank clamp assembly of claim 15, wherein said beam is fixedly attached to said base member.

17. The crank clamp assembly of claim 14, further comprising a third crank clamp arranged and configured to secure a crank arm of a bicycle, said third crank clamp being affixed to said support member and spaced from said first and said second crank clamps; said crank clamp attachment further comprising a third wheel holddown for securing a wheel of the bicycle held by said third crank clamp, said third wheel holddown being affixed to said support member and spaced from said first and second wheel holddowns.

18. The crank clamp assembly of claim 14, wherein said support member comprises a plate secured to said attachment structure, said plate having forward, rearward, left, and right edges, the intersections of said edges forming forward left, forward right, rearward right, and rearward left corners, said first wheel holddown being attached at one of the forward left and forward right corners of said plate, and said second wheel holddown being attached to one of the rearward left and rearward right corners of said plate, said first wheel holddown being attached to a first of the left and right edges, and said second wheel holddown being attached to the second of the left and right edges, said first and second wheel holddowns extending downward from the plate.

19. A rack for carrying bicycles with a vehicle, the bicycles having pedal crank arms, the rack comprising:
 (a) a base member securable to the vehicle to project away from the vehicle;
 (b) a first support member having a bottom end and a top end, the bottom end being pivotally connected to said base member and projecting upwardly therefrom;
 (c) a top member connected to the top end of said first support member; and
 (d) a crank clamp connected to said top member, said crank clamp including a housing for receiving a crank arm of a bicycle and a moveable jaw for holding the crank arm against the housing.

20. The rack of claim 19, further comprising a second support member having a bottom end and a top end, the bottom end being pivotally connected to said base member and projecting upwardly therefrom, the top end being connected to said top member, said second support member being adjacent said first support member.

21. A vehicle rack for securing bicycles having pedals and crank arms, the rack comprising:
 (a) a base beam securable to the vehicle to extend outwardly therefrom; and
 (b) a first crank clamp attached to said base beam and including: (1) a generally C-shaped housing with a slot in one side and an opening in one end, and (2) a jaw member, the C-shaped housing and the jaw member being configured such that a crank arm having a pedal attached thereto may be inserted in said opening of said C-shaped housing so that the pedal extends out of said slot and said jaw member may be tightened against said crank arm so as to secure the crank arm in place.

22. The rack of claim 21, further comprising a first wheel rail attached to said base beam for securing a wheel of the bicycle.

23. The rack of claim 22, further comprising a second crank clamp attached to said base beam and a second wheel rail attached to said base beam.

24. The rack of claim 21, wherein said jaw member of said first crank clamp includes a moveable screw with a head disposed within said housing for forcing the crank arm against the side of the housing, the pedal projecting outside of the housing through the slot.

25. The rack of claim 24 wherein said housing includes a cupping surface and a moveable jaw opposite said cupping surface, the crank arm being securable between the cupping surface and the moveable jaw.

26. A crank clamp assembly for holding bicycles behind a vehicle, said crank clamp assembly comprising:
 an attachment structure coupleable to the vehicle;
 a support member defining a support plane attached to said attachment structure;
 a first crank clamp arranged and configured to secure a crank arm of a bicycle, said first crank clamp being affixed to said support member; and
 a wheel holddown attached to an outer edge of the support member and extending downward from the support plane of the support member, the wheel holddown for securing a from wheel of a bicycle held by said first crank clamp.

27. The crank clamp assembly of claim 26, further comprising a second crank clamp arranged and configured to secure a crank arm of a bicycle, said second crank clamp being affixed to said support member and spaced from said first crank clamp; and a second wheel holddown for securing a wheel of the bicycle held by said second crank clamp, said second wheel holddown being attached to an outer edge of the support member and configured to extend downward from the support plane of the support member.

* * * * *

UNITED STATES PATENT AND TRADEMARK OFFICE
CERTIFICATE OF CORRECTION

PATENT NO. : 5,658,119
DATED : August 19, 1997
INVENTOR(S) : Allsop, et al

It is certified that error appears in the above-identified patent and that said Letters Patent is hereby corrected as shown below:

| COLUMN | LINE | |
|---|---|---|
| 11 | 32 | "and fourth the" should read --and fourth-- |
| (Claim 1, | line 18) | |
| 14 | 14 | after "claim 24" insert --,-- |
| (Claim 25, | line 1) | |
| 14 | 29 | "a from wheel" should read --a front wheel-- |
| (Claim 26, | line 12) | |

Signed and Sealed this

Sixth Day of January, 1998

Attest:

BRUCE LEHMAN

Attesting Officer     Commissioner of Patents and Trademarks